Figure 1:
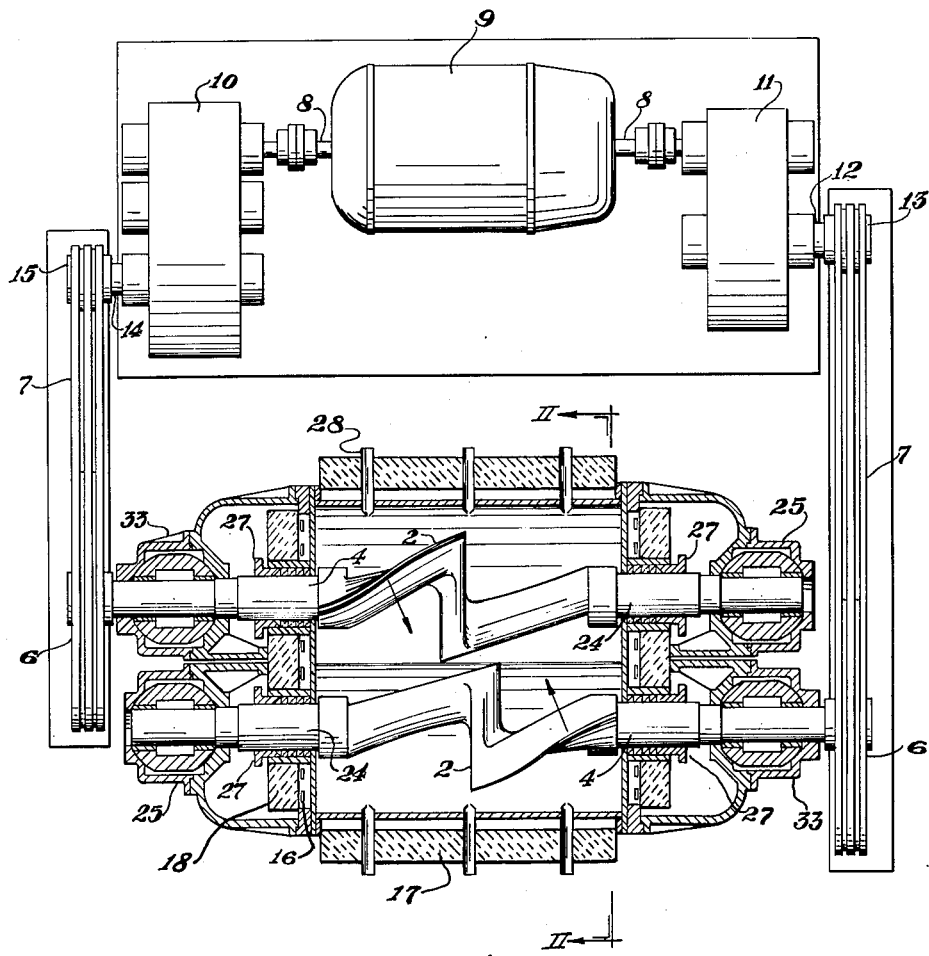

Feb. 28, 1956 G. A. WEBB 2,736,754
PROCESS AND APPARATUS FOR PRODUCING HYDROXY AROMATICS
Filed Dec. 4, 1951 2 Sheets-Sheet 1

INVENTOR.
GEORGE ARTHUR WEBB
BY
Sewall P. Bronstein
his ATTORNEY

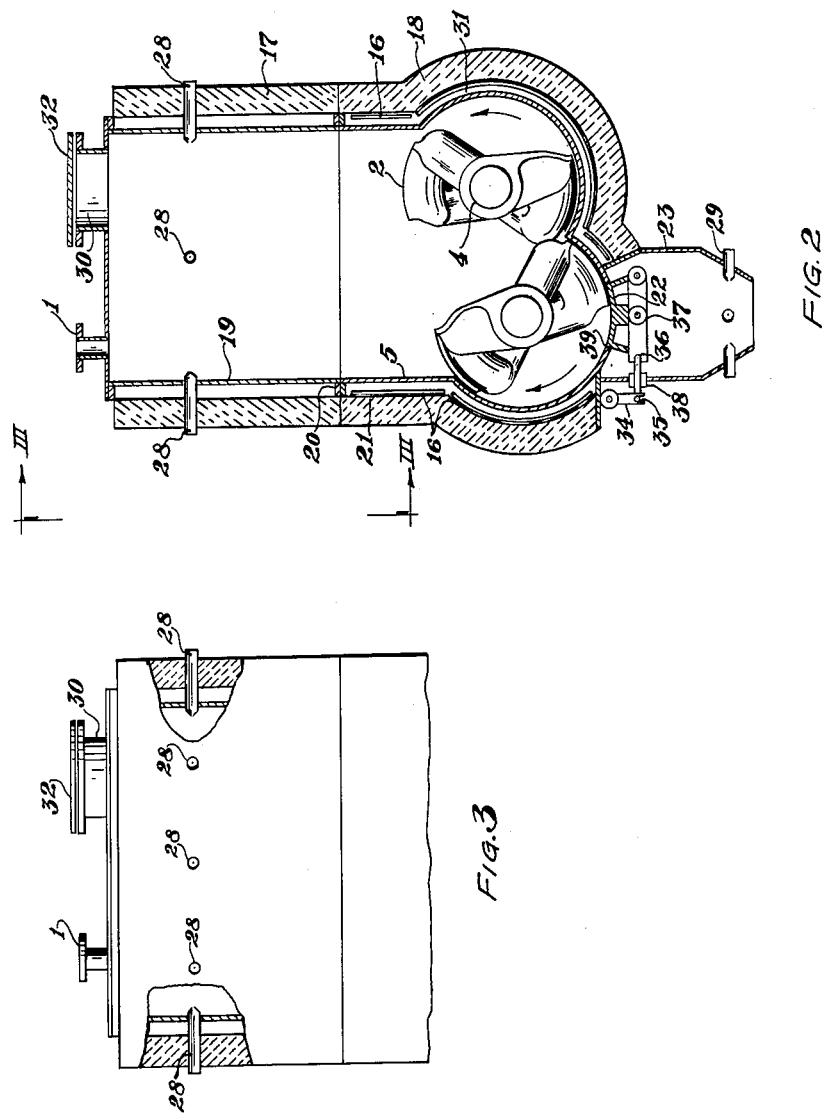

United States Patent Office 2,736,754
Patented Feb. 28, 1956

2,736,754

PROCESS AND APPARATUS FOR PRODUCING HYDROXY AROMATICS

George Arthur Webb, Pittsburgh, Pa., assignor to Koppers Company, Inc., a corporation of Delaware Application December 4, 1951, Serial No. 259,866

15 Claims. (Cl. 260—628)

This invention relates to a fusion process, and specifically to the manufacture of polyhydric aromatic compounds, hereinafter referred to as polyhydric aromatics, by a fusion process.

More specifically, this invention relates to the fusion of the alkali metal salts of aromatic polysulfonic acids and alkali metal hydroxides to form the alkali metal salts of polyhydric aromatics from which polyhydric aromatics can be obtained.

According to the present invention, the above fusion is carried out in such a manner that the reactants are subjected to a simultaneous, positive kneading and cutting force or a simultaneous, positive kneading, cutting, tearing, stretching and folding force during the course of the fusion, which force is supplied by carrying out the reaction in a multiple arm dough mixer having at least two mixing arms rotating on two different horizontal axes, which mixing arms are driven by a driving means capable of comparatively high power output.

During the fusion of alkali metal salts of aromatic polysulfonic acids and alkali metal hydroxides to form the alkali metal salts of polyhydric aromatics, the reaction mass becomes thick and doughy and very difficult to mix effectively. Because of this difficulty in effecting thorough mixing during such fusions, many undesirable conditions exist, such as local overheating and the necessity of extended reaction time, all of which contribute to very low yields of desired product.

In the past, in order to overcome this mixing problem, ordinary paddle-type mixers have been utilized in conjunction with a large excess of melted diluent, such as melted alkali metal hydroxide, to keep the reaction mass sufficiently fluid to permit effective mixing.

However, the use of a large excess of melted alkali metal hydroxide results in the presence of a large quantity of unreacted alkali metal hydroxide in the fusion mass, which forms an inorganic salt with part of the sulfuric or other acid which must be added in a subsequent step of the process to convert the alkali metal salts of the polyhydric aromatics to the polyhydric aromatics. The alkali metal hydroxide and acid consumed in forming these inorganic salts are not economically recoverable and hence increase the total cost of the process.

Furthermore, even with the use of a large excess of alkali metal hydroxide, a reaction time of 8 to 10 hours is necessary, which results in a low throughput for each reaction kettle. This necessitates the use of a large number of reaction kettles to produce commercial quantities of hydroxy aromatics, resulting in a large investment in equipment and high labor costs.

Efficient mixing is not nearly so difficult or critical in the fusion of alkali metal benezene monosulfonate with alkali metal hydroxides for the production of phenol because the monosulfonate reaction mass is not nearly as viscous and doughy as the aromatic polysulfonate reaction mass.

The viscosity of the fusion mass and therefore the difficulty of efficient mixing varies according to the particular alkali metal sulfonate and hydroxide utilized. For instance, the reaction mass in the fusion of sodium sulfonates with sodium hydroxide is more viscous than the reaction mass in the fusion of potassium sulfonates with potassium hydroxide.

The present invention provides an efficient and improved process for the fusion of the alkali metal salts of aromatic polysulfonic acids with alkali metal hydroxide, wherein the reaction is efficiently carried out with high yields and short reaction times in a heated reactor without the use of a large excess of alkali metal hydroxide.

The present invention provides such an improved fusion process by subjecting the reactants during the course of the fusion to a simultaneous positive kneading and cutting force or a simultaneous positive kneading, cutting, tear, stretching and folding force.

The present invention provides such a simultaneous positive kneading, and cutting force, or simultaneous positive kneading, tearing, cutting, stretching and folding force by carrying out the fusion in a multiple arm dough mixer, and more specifically in a kneader type mixer, the mixing arm or arms of which dough mixer or kneader type mixer, are rotated on two different horizontal axes by a driving means capable of comparatively high power output.

The accompanying drawings form a part of this specification and illustrate for purposes of exemplification the preferred forms of apparatus for practicing this invention without limiting the claimed invention to such illustrative instance.

Fig. 1 discloses a plan view of the apparatus embodying this invention with the kneader in section.

Fig. 2 discloses an end section along the line II—II of Figure 1.

Fig. 3 discloses a view taken along the section III—III of Figure 2.

Referring to the above figures, reference numeral 5 indicates a 400 gallon trough-shaped reactor comprising a typical kneader-type mixer, preferably made of inconel or lined with inconel. The trough is shaped to conform to the peripheral shape of two oppositely-rotating, diagonally-spaced, horizontally parallel kneader mixer blades 2 so that the clearance between the inside walls of the reactor and the peripheries of the blades is small.

The inside walls of the reactor are heated by conventional electric heating elements 16, around which insulation 18 is provided to prevent heat loss. Air space 31 is provided between heating elements 16 and the outside wall of reactor 5 to prevent hot spots.

A cylindrical trough extension member 19 having a layer of insulation 17 around its outside walls is attached to the top of the kneader reactor by means of abutting flanges 20 and 21. These flanges may be welded or bolted (not shown) together. This extension member acts as a safety in the event of foaming over during the course of the reaction in the kneader.

Each of two diagonally spaced, horizontal, parallel shafts 4 supported by support bearings 33 passes into the reactor through a side wall thereof opposite from the side wall through which the other shaft enters the reactor. Each of these shafts extends into a kneader mixer blade 2 within the kneader and finally reverts into an end shaft portion 24, which then passes out of the reactor through a side wall opposite the first-mentioned wall through which the shaft entered the reactor and finally rests in dead-end or support bearing 25. Bearings 25 and 33 provide suitable journal for these shafts and shaft portions for rotation thereof in packing glands 27 in the side walls of the reactor.

Mixing blades 2 may be conventional sigma type blades as disclosed in "Chemical Machinery" by Emil R. Riegel published in 1944 (page 241, figure 193).

The two shafts are rotated simultaneously in opposite directions by means of motor 9 having a capacity of 150 H. P. through motor shafts 8, reducers 10 and 11, driven shafts 12 and 14, driving sprockets 13 and 15, sprocket driving chains 7 and driven sprockets 6.

Reducers 10 and 11 are so arranged and constructed that the direction of rotation of one of the shafts 8 is reversed and consequently driven shafts 12 and 14 and ultimately shafts 4 are caused to rotate in opposite directions.

The alkali metal hydroxide and aromatic poly sulfonate are charged into the reactor through an inlet 30 provided with a tightly fitting cover 32.

The water of reaction in the form of vapor escapes through vent means 1.

A plurality of dry steam nozzles 28 attached to a dry steam supply conduit (not shown) passes through the side walls of the trough extension member 19, all equally spaced from each other and in the same horizontal plane. Dry steam issuing from these nozzles forms a dry steam blanket protecting the reaction mass in the kneader from contact with air.

A discharge port 39 at the bottom of the kneader, may be opened and closed by a discharge control device. Any type of conventional discharge control device may be utilized, such as a hinged door 22 held closed by a pivotable arm 34 pivoted at one end to the reactor, the other end of which forces a pin 35 into a slot 36 in a bar 37 attached to door 22. The pin 35 in slot 36 holds bar 37 and consequently door 22 in a closed position. Pivoting arm 34 so that pin 35 moves out of slot 36 allows the door 22 to open. Arm 34 may be moved manually, electrically or hydraulically. Pin 35 slides in a cylinder or guide 38 which is attached to hopper 23. The movement of door 22 may be controlled manually, hydraulically or electrically. Attached to the bottom of the kneader under the discharge port is a hopper 23 which receives the reaction mass and funnels it to a quenching device (not shown) where the hot reaction mass is quenched by water or other means.

A plurality of equidistantly spaced dry steam nozzles 29 protrude through and form a ring around the side walls of the hopper. Dry steam flowing from these nozzles protects the reaction mass from exposure to the air while the discharge port is open.

Although the above detailed description has dealt with one particular preferred type of multiple arm dough mixer, namely a kneader type mixer, in which the fusion of alkali metal salts of aromatic polysulfonic acids and alkali metal hydroxide is carried out according to the present invention, any conventional multiple arm dough mixer, the mixing arms of which rotate on different horizontal axes, can be utilized. The features required are that the mixer be of the type having at least two mixing arms rotating on different horizontal axes which mixing arms impart a simultaneous positive kneading and cutting force or a simultaneous kneading, cutting, stretching, tearing and folding force to the reaction mass and is characteristically operated by a motor or other driving means capable of developing relatively high power outputs. Any type of multiple arm dough mixer generally adapted to handle extremely viscous and plastic masses can be utilized.

Conventional types of such multiple arm dough mixers are the so called "kneader mixers," "ribbon or screw conveyors and mixers having at least two ribbons or screws on different axes," "pug mills," "mixing rolls and plasticators," and "banbury mixers." These multiple arm dough mixers and their characteristic properties are set forth in the "Chemical Engineers' Handbook," 3rd ed., 1950, by John H. Perry on pages 1207–1210.

The blades or rolls of all of these mixers are especially designed to handle doughy masses, to impart a simultaneous positive kneading and cutting force, or a simultaneous positive kneading, stretching, cutting and folding force to such doughy masses, and to be driven by a driving means of relatively high horse power. They are designed to provide intimate contact between constituents, irrespective of great viscosity, by forcing the particles of one constituent between the particles of the other constituent, and by bringing such constituents to the place where they may best be subjected to this force. The blades or rolls of this type of mixer are especially designed not only to efficiently mix doughy masses but also to utilize or transmit the necessary power required to mix these viscous masses. A heavy duty blade or roll is thus a common and necessary feature.

Some of the above multiple arm dough mixers knead, cut and stretch, others knead, cut, and tear, and still others knead, cut and fold. The common feature of all these dough mixers is their combined kneading and cutting action.

The preferred and most advantageous action is a simultaneous positive kneading, tearing, stretching, cutting and folding, which occurs in the kneader mixers.

It is important that the simultaneous kneading and cutting force or simultaneous kneading, cutting, stretching, tearing and folding force be positive. That is, it must be applied by at least two positively driven rolls or blades each of which rotate on a different horizontal fixed axis, and each of which is capable of being driven by a driving means of relatively high horespower.

A non-positive or floating kneading force, as for example the forces applied by balls in a ball mill, will not produce the unexpected results of the present invention.

The term "multiple arm dough mixer" in this specification designates any of the above-named types of mixers.

Although the inventive process can be carried out in any one of the above multiple arm dough mixers, it has been found that the use of conventional kneader type mixers, examples of which are shown on page 1207 of Perry and page 241 of Riegel, and especially the modified kneader type mixer described in the drawings, which conventional and modified kneader type mixers have two oppositely-rotating, heavy-duty mixing blades rotating on different horizontal axes, is particularly advantageous and provides very efficient mixing with resultant high yields and short reaction times.

The increased advantages of the kneader type mixer over other multiple arm dough mixers are probably due to the fact that in the former there is a combined kneading, tearing, cutting, stretching and folding action, while in the latter there is only a kneading and cutting action alone or in combination with only one or two of the tearing, stretching and folding actions.

Any standard, kneader mixer blades, examples of which are disclosed in Figure 192 on page 240 of Riegel can be utilized in the preferred kneader type mixer of the present invention. Furthermore, various modifications of such mixing blades are satisfactory. The preferred and most advantageous blade shape is that illustrated in the drawings.

All these kneader type mixers involve at least two kneader mixer blades rotating on different horizontal axes in a container conforming to the peripheral shape of the blades, wherein there is mastication resulting from shearing between the blade peripheries and the contour surfaces of the vessel, and kneading, as well as folding, stretching and tearing, resulting from the shape and interrelational position of the blades.

Although the invention is applicable to the dry fusion of the alkali metal salts of aromatic polysulfonic acids and alkali metal hydroxides, the preferred embodiment of this invention involves the fusion of disodium benzene meta disulfonate and sodium hydroxide. The invention is especially adapted for the fusion of these compounds, since the reaction mass is especially difficult to mix effectively. The present invention will be described henceforth in relation to this specific fusion.

However, the fusion of an ortho disulfonate or a trisulfonate may be effectively carried out according to the present invention, as well as any aromatic monosulfonate, which, when fused with alkali metal hydroxide, passes through a very viscous, doughy stage. Furthermore, the aromatic sulfonates may be unsubstituted or substituted by such groups as the amino, hydroxy, etc. groups. The present process can also be applied to the fusion of alkali metal hydroxides and aromatic compounds having an acidic radical attached thereto, wherein the reactants during the fusion process become very viscous and thick.

Solid disodium benzene disulfonate and fused caustic are flowed into the kneader reactor of the type shown in the figures. The fused caustic is usually added first below, at or above reaction temperature and then the solid disodium benzene disulfonate salt is added slowly over a period of time to prevent excessive foaming due to the escape of steam from the reaction mass. Heat from the walls of the reactor supply sufficient heat to bring the reactants to reaction temperatures. The rotating kneader mixer blades thoroughly mix the reactants during the course of the reaction. The reaction itself is slightly exothermic.

Immediately upon addition of the salt, the power utilized by the blades rises to a peak value which persists until the entire mixture has been transformed into an apparently uniform paste after which it decreases. Once the paste has been formed, there is a clearly noticeable evolution of steam indicating that reaction is taking place. As the reaction progresses the paste gradually becomes more and more viscous and the power requirement gradually increases.

After awhile, steam evolution ceases completely, the mass reaches a maximum viscosity and a second power peak is observed. During this power peak, the paste becomes very doughy, is finally transformed into a powder and is so discharged. Once the powder state has been attained, power consumption drops again from its peak value and remains substantially the same until the end of the run.

The reaction is preferably carried out in the absence of air. Advantageously, it is carried out in an inert gas atmosphere. In the preferred apparatus, dry steam is introduced through nozzles 28 to form a protecting blanket of inert gas over the reaction mass. However, the reaction will occur when carried out in contact with air but the reaction mass becomes discolored and yields are materially decreased. It is believed that the discoloration and decreased yields are caused by the oxidation of part of the resorcinate by the air. After the reaction is complete, the reaction mass is discharged from the bottom of the reactor into a quenching media. During the discharge of the mass, it is protected from the atmosphere preferably by a blanket of inert gas. In the preferred apparatus the inert gas is supplied by nozzles 29.

The reaction temperatures utilized must be at least equal to the temperature at which the reaction of disodium benzene meta disulfonate and caustic will occur, and at most those temperatures at which the reaction products or reactants will decompose. The reaction temperature should be at least about 310° C. A preferred range of reaction temperatures is from about 340–350° C. A temperature of about 360° C. may be successfully utilized and temperatures as high as about 400° C. appear to have no harmful effects on the reaction. Below about 320° C. the reaction time is considerably increased. Temperatures of from about 350–370° C. result in very fast reaction time and less foaming when introducing the reactants, but the use of such high temperatures is not economically as practical as temperatures of from about 340–350° C.

The reaction can be carried out at atmospheric or sub-atmospheric pressures. Pressures as low as about 30 mm. Hg can be utilized. Operation at atmospheric pressure is preferred due to economic considerations. When utilizing sub-atmospheric pressure, however, the reaction time is greatly decreased. The use of a vacuum provides simultaneously a means for removing water from the system as well as a means for protecting the reaction mass from the contact with air.

It is important, to obtain efficient yields, that the water of reaction be immediately removed from the reaction mass as fast as possible. An open system can provide this removal of water most economically and effectively. The rotation of the horizontal blades aids in the removal of the water of reaction by throwing the water upwardly out of the mass toward the vapor vent.

However, other means of removing water can be employed such as the use of water absorbing compounds, blowing hot inert gases through the reaction mass, or the already suggested use of a vacuum wherein the water is sucked from the system.

Although it is preferred to remove the water of reaction by utilizing an open system, exposure of the reaction mass to the atmosphere should be avoided in order to prevent undesirable resorcinate oxidation.

The use of a vented extension member over the kneader reactor, such as member 19 in the drawings, provides an open system for water removal, permits the containment of frothing, and prevents access of air to the reaction mass by virtue of the ring of nozzles provided in the extension member walls through which superheated steam is introduced to form an inert blanket over the reaction mass. However, any other conventional means of protecting the reaction mass from exposure to air can be utilized For instance, as previously mentioned, a vacuum is very satisfactory.

Any inert gas may be used to protect the reaction mass from the atmosphere, such as nitrogen and superheated steam. Superheated steam is preferred from an economical standpoint.

The reactants may be added in any manner desired. It is advantageous to introduce first fused caustic and then slowly the solid sulfonate salt. As stated above, the salt is added slowly to prevent excessive foaming. However, it is found that the higher the reaction temperature the less the foaming, and therefore the faster the permissible rate of sulfonate addition. At temperatures of about 340–350° C. the salt may be added over about a 10 to 15 minute interval. However, the invention is not limited to any particular rate of sulfonate addition. The disulfonate and fused caustic may be added together so long as the hood member is sufficiently high to prevent foaming over. However, this is usually undesirable since excessive foaming prevents efficient operation of the apparatus. The caustic may be added as a solid as well as a liquid, before or after the addition of the sulfonate salt. The sulfonate salt may or may not be preheated. Solutions such as aqueous solutions of either caustic or sulfonate can be utilized.

The apparatus is preferably made of high-nickel alloys, that is, alloys containing a major proportion of nickel. Nickel itself or inconel (80% nickel, 14% chromium and 6% iron) can be utilized. Inconel is preferred. Although alloys containing high proportions of nickel are preferred, they are not essential and any metal such as stainless steel or cast iron may be utilized which will resist high temperatures, is abrasion resistant, and will not corrode excessively when contacted with caustic at the high temperatures utilized.

According to the present invention, yields of resorcinol approaching 100% are obtained with a slight excess of caustic over the theoretical quantity required. For instance, yields of over 97% are obtained with about a 5% excess of caustic over theoretical or stoichiometric amounts. Yields of 99% and over are obtained with about 10%–20% of excess caustic. The addition of more than about 20% excess caustic, although not hindering the reaction, does not increase the yield. The use of 40% excess caustic results in no greater yield than the use of 20% excess. The high yields obtained with the use of only from about 5–10% excess caustic is one of the salient features of the present invention, since it has been necessary in the past to utilize large excesses of caustic in order to obtain yields equivalent to those obtained in the present invention.

The time of reaction required to obtain the above yields varies with the reaction temperatures and pressures utilized. The higher the temperature and the lower the pressure, the shorter the reaction time. However, at preferred temperatures of from about 340–350° C. and at atmospheric pressures, reaction times of about 20 to 40 minutes result in over 97% yields. At lower temperatures, an increase in reaction time is required. At about 330° C. the reaction time is about one hour. Below about 330° C. reaction times as long as about 2 hours or more are required. However, at temperatures of about 360° C. and above, the reaction time is about 15 minutes or less. This short reaction time is another salient feature of the invention since in the past even when utilizing large excesses of caustic, in order to obtain yields anywhere near equivalent to the yields obtained in the present invention, reaction times of from 7–10 hours were required when utilizing conventional temperatures of from 340° C.–350° C. and atmospheric pressures.

The reaction time is considerably reduced when reduced pressures are utilized.

Any means for heating the inside reactor walls in order to supply heat to the reactants may be utilized. Conventional types of insulated electrical heating elements are satisfactory. An insulated jacket may be utilized with hot steam, Dowtherm, fused salts or any other type of fluid circulating therethrough. The use of electrical heating means is preferred.

The mixing blades may be hollow or solid. If they are hollow, hot or cold liquids may be circulated therethrough to provide heat for raising the reactants to reaction temperatures or to cool the reaction masses. The external surfaces of the blades may be electrically heated to supply part of the heat for raising the reactants to reaction temperatures.

It has been stated that a blade driving means must be utilized which will allow the development of a comparatively large amount of power to effectively rotate the mixing blades during the power peak of the reaction when the reaction mass is most viscous. The driving means must be able to develop sufficient power to drive the mixing blades at a rate which will adequately comingle the highly viscous reaction mass.

There is no critical power requirement. It may vary from about 1 horsepower to about 200 horsepower or more depending on the size of the unit, the size of the charges to be used, and the particular design of the unit.

No particular blade R. P. M. is critical so long as the blade peripheries are rotated at a speed which will bring about the desired action of efficiently comingling the reactants, efficiently distributing heat throughout the reactants, and efficiently throwing out of the reaction mass the water of reaction as it forms. R. P. M.'s of from about 3–200 may be used depending on the capacity of size of the unit and blades, the size of the charges to be utilized and the particular design of the blade and unit.

The blade driving means must be able to develop sufficient power to maintain the desired blade R. P. M. constant throughout the reaction. Since the greatest power must be developed at that stage of the reaction when the mass becomes the most viscous and stiff, a driving means must be utilized having at least sufficient power capacity to maintain constant blade R. P. M. during this period of greatest viscosity.

In a 400 gallon unit of the type shown in the drawings with an 1800 lb. caustic charge and a 3000 lb. disodium benzene meta disulfonate charge, an R. P. M. of 19 may be utilized at which R. P. M. a power peak of about 60,000 watts is required.

In a 5 gallon unit utilizing 18.8 lbs. caustic and 27.6 lbs. disodium benzene meta disulfonate an R. P. M. of 80 is utilized and a power peak of 7050 watts is required.

The specific R. P. M.'s and power requirements given above merely serve to demonstrate examples of practical rotational speeds and power requirements for two particular unit designs.

It is apparent that the larger the unit and the bigger the charge the slower the R. P. M. and the higher the power peak.

In the preferred embodiment of the invention a 150 H. P. motor is utilized to drive the blades of a 400 gallon capacity reactor.

The disodium benzene meta disulfonate may be chemically pure or a commercial grade containing impurities.

*Example 1*

Into a 5 gallon capacity unit as illustrated in the drawings, 27.6 lbs. of disodium benzene meta-disulfonate was charged. Then 18.84 lbs. (20% excess) of fused caustic was added over a 12 minute period. Blade R. P. M. was 80. Reaction temperature was 340° C. and a superheated steam atmosphere was maintained over the reaction mass. The peak power load of 7050 watts occurred 17 minutes after the addition of caustic was begun. The complete reaction time was 22 minutes after which the resorcinate mass was quenched by pouring into a tank of cold water. Sodium sulfite crystals settled to the bottom of the tank. The mass was then centrifuged to remove the sodium sulfite crystals and then sulfuric acid was added to spring the resorcinol from the resorcinate. The resorcinol was then extracted from the mass with ethyl ether which was then evaporated to leave a crude resorcinol. The crude resorcinol was distilled to recover a pure resorcinol fraction.

A 97% resorcinol yield was obtained based on the bi-salt.

*Example 2*

Into a 400 gallon capacity unit as disclosed in the drawings, 1800 lbs. fused caustic (6% excess) was charged. Then 3000 lbs. of disodium benzene meta-disulfonate was added over a 15 minute period. Blade R. P. M. was 19. The peak power load was 60,000 watts. A superheated steam atmosphere was maintained over the reaction mass. Reaction temperature was 345° C. Reaction time was 25 minutes, after which the mass was quenched and resorcinol was recovered in the same manner as in Example 1. The yield of resorcinol was over 96% of theoretical based on pure sodium benzene disulfonate.

In accordance with the present invention then it is possible to produce from caustic and disodium benzene meta-disulfonate, yields of resorcinol approaching 100% of theoretical utilizing as low as theoretical quantities of caustic and reaction times as low as 20 minutes.

It is indeed surprising and unexpected that by merely carrying out the fusion of disodium benzene meta-disulfonate and caustic in a kneader type mixer, high yields of resorcinol may be obtained utilizing theoretical quantities of caustic and reaction times of 20 minutes.

The unexpected advantages of the present process are as follows:

First, large excesses of caustic which are ultimately wasted are not necessary as in prior art processes. Hence caustic savings are considerable.

Second, since large excesses of caustic are not necessary, the reaction mass contains very little unreacted caustic. Therefore very little if any sulfuric acid in excess of that required for springing the resorcinol is wasted in neutralizing the unreacted excess caustic.

Third, the present process permits increased production capacity of resorcinol per unit, since the reaction times are very short and hence fewer units are required than in the older processes. Furthermore, less labor is required to operate the smaller number of units.

Fourth, practically theoretical yields of resorcinol are obtained.

Fifth, the product obtained is uniform, contains a minimum of impurities and is not discolored.

Sixth, the smaller amounts of excess caustic and acid result in decreased equipment replacement and repair especially when a high nickel-containing metal is utilized as a reactor material.

Although an attempt has been made to explain the theoretical basis for the unexpected results obtained in utilizing the present invention, it is not intended that the invention be limited to such a theory.

It will be obvious to those skilled in the art that various modifications can be made in the several parts of the present apparatus and the several steps of the present process in addition to those enumerated hereinabove without departing from the spirit of the present invention and it is intended to cover in the claims such modifications as are included within the scope thereof.

I claim:

1. A fusion process for producing polyhydroxy aromatic compounds which includes the steps of fusing an alkali metal salt of an aromatic polysulfonic acid and an alkali metal hydroxide in about 5% to about 20% excess of the amount required to form the alkali metal polyphenate, and subjecting the viscous doughy reaction mass which results to simultaneous, positive, kneading and cutting forces during the course of reaction at a temperature of about 320° C. to about 360° C. and until a dry powder is obtained.

2. The process of claim 1 wherein the reaction is carried out at subatmospheric pressure.

3. The process of claim 1 wherein the simultaneous positive, kneading and cutting forces are supplied by carrying out said fusion process in a multiple arm dough mixer.

4. The process of claim 3 wherein the reaction is carried out without exposure to air and the water of reaction is substantially removed from the reaction mass upon formation.

5. A fusion process for producing polyhydroxy aromatic compounds which includes the steps of fusing an alkali metal salt of an aromatic polysulfonic acid and an alkali metal hydroxide in about 5% to about 20% excess of the amount required to form the alkali metal polyphenate, and subjecting the viscous doughy reaction mass which results to simultaneous, positive, kneading, cutting, tearing, stretching, and folding forces during the course of the reaction at a temperature of about 320° C. to about 360° C. and until a dry powder is obtained.

6. The process of claim 5, wherein the reaction is carried out at subatmospheric pressure.

7. The process of claim 5 wherein the simultaneous positive kneading, cutting, tearing, stretching and folding forces are supplied by carrying out said fusion process in a double arm kneader type mixer.

8. The process of claim 7 wherein the alkali metal salt of the aromatic polysulfonic acid is disodium benzene meta-disulfonate, and the alkali metal hydroxide is sodium hydroxide.

9. The process of claim 7 wherein the reaction is carried out at subatmospheric pressure.

10. The process of claim 7 wherein the reaction is carried out in an inert gaseous atmosphere and the water of reaction is substantially removed from the reaction zone upon formation.

11. The process of claim 10 wherein the reaction is carried out at subatmospheric pressure.

12. The process of claim 10 wherein the inert gaseous atmosphere is superheated steam.

13. The process of claim 12 wherein the alkali metal salt of aromatic polysulfonic acid is disodium benzene meta-disulfonate, and the alkali metal hydroxide is sodium hydroxide.

14. The process of claim 10, wherein the reaction is carried out at a temperature at least equal to the reaction temperature of the alkali metal salt of the aromatic polysulfonic acid and the alkali metal hydroxide, but no greater than the decomposition temperature of the polyhydroxy aromatic and the aromatic polysulfonate.

15. The process of claim 14 wherein the alkali metal salt of the aromatic polysulfonic acid is disodium benzene metadisulfonate, and the alkali metal hydroxide is sodium hydroxide.

References Cited in the file of this patent

UNITED STATES PATENTS

| | | |
|---|---|---|
| 1,406,745 | McCormack | Feb. 14, 1922 |
| 1,808,722 | Hempel | June 2, 1931 |
| 2,272,272 | Mow | Feb. 10, 1942 |
| 2,353,237 | Harris, Jr. | July 11, 1944 |
| 2,407,045 | Tyrer | Sept. 3, 1946 |
| 2,578,823 | Molinari et al. | Dec. 18, 1951 |

OTHER REFERENCES

Perry: Chemical Engineer's Handbook, 2nd Ed. (1941), pp. 1548–9 (2 pages), McGraw-Hill, New York.